United States Patent [19]

Blumauer

[11] Patent Number: 5,342,457
[45] Date of Patent: Aug. 30, 1994

[54] METHOD FOR THE PRODUCTION OF A SWITCH DIAMOND

[75] Inventor: Johannes Blumauer, Zeltweg, Austria

[73] Assignee: Voest-Alpine Eisenbahnsysteme Gesellschaft m.b.H.

[21] Appl. No.: 863,057

[22] Filed: Apr. 3, 1992

[30] Foreign Application Priority Data

Apr. 5, 1991 [AT] Austria ................................... 729/91

[51] Int. Cl.⁵ .............................................. C21D 9/00
[52] U.S. Cl. .................................... 148/534; 148/581; 148/624; 148/662; 148/663
[58] Field of Search ................ 148/534, 581, 624, 662, 148/663

[56] References Cited

U.S. PATENT DOCUMENTS 879,634  2/1908  Hadfield ............................. 148/581

FOREIGN PATENT DOCUMENTS 63-128123  5/1988  Japan ................................... 148/581

Primary Examiner—Richard O. Dean
Assistant Examiner—Robert R. Koehler
Attorney, Agent, or Firm—Cushman, Darby & Cushman

[57] ABSTRACT

In a method for the production of a switch diamond for switch rails and double crossovers with a switch diamond point out of carbon steel and connector rails, the switch diamond point is rolled and submitted to heat treatment, by which the switch diamond point is transformed over its total cross-section into a fine pearlite texture, whereby subsequently the switch diamond point is tempered and at least in the area where the wheels roll over, a material removing treatment for the removal of the wheel zone texture different from the fine pearlite texture is put underneath and afterwards the switch diamond point is welded to connector rails, so that the production of a switch diamond is simplified and heat treatment in a conventional apparatus is made possible.

8 Claims, No Drawings

METHOD FOR THE PRODUCTION OF A SWITCH DIAMOND

The invention relates to a method for the production of a switch diamond for rail switches and double crossovers with a switch diamond point out of carbon steel and connector rails.

For the production of switch diamonds various methods have become known in which, basically, connector rails have been welded directly to a switch diamond point, or instead, these connector rails have been connected to the switch diamond point by means of intermediary parts. Switch diamond points are normally produced as cast parts, particularly as high-carbon steel cast parts. In the use of high manganese steel intermediary parts are normally used to prevent negative microstructural changes by diffusion during the welding procedure between the switch diamond point and the connector rail. After the welding procedure a more or less tedious heat-treating step follows for tempering the surfaces, and it is known, from DE PS [German patent] No. 25 41 978 for example, to include such a heat-treatment of point parts in the production procedure. The choice of this type of production procedure to this extent appropriate, since switch diamond points with pre-welded connector rails present relatively large construction parts, which can not be readily heat-treated in a furnace without having to select exaggeratedly large furnace dimensions. A further type of procedure for heat-treatment of point parts can be taken for example from the AT PS [Austrian patent] No. 384 624. Also in this procedure the required surface quality or temper is attained by relatively tedious controls of the heat-treatment conditions.

Switch diamonds can be formed depending on the construction design either with moveable points or moveable guard rails and out of various materials, such as for example high manganese steel, maraging steels or other materials with high resistance to wear. Determined by the different cross-section forms and the different analyses of these types of switch diamond points, the formation of non-foliated texture structures, such as martensite or of the texture of the lower intermediary layer in the surface area can be obtained in the production of the point. Depending on different heating in the tempering procedure, slack appears as a result which must be later removed, if special measures are not undertaken during the heating to avoid this slack. Up to now the required conditions for heating in the tempering procedure could only be controlled in a production process tempering after successful welding of the switch diamond point with the connector rails.

The object of this invention is to simplify the production of switch diamonds of the type named at the beginning and particularly to enable the carrying out of a heat treatment which obtains the desired texture and surface tempering with conventional apparatuses. To accomplish this the method according to the invention of the type named at the beginning consists basically of the fact that the switch diamond point is rolled and submitted to heat treatment in which the switch diamond point is transformed over its total cross-section into a fine pearlitic texture, that subsequently the switch diamond point is tempered and at least in the area where the wheels roll over, subjected to a material removing treatment to remove the wheel zone textures which are different from the fine pearlitic texture, and that afterwards, the switch diamond point is welded to connector rails. Since a rolled switch diamond point is used, various steel qualities can be used for the switch diamond point and since this type of switch diamond point as a consequence is already submitted to a heat treatment before being welded to the connector rails, a heat treatment of this type can be carried out in conventional ovens. Moreover, no exceptional concern must be given in the heat-treatment of this type of switch diamond point, if, as proposed in the invention, the switch diamond point is tempered and at least in the area where the wheels roll over subjected to a material removing treatment. Through such a material removing treatment or machining indeed undesirable textures in the edge zones or wheel path surfaces of the switch diamond point can be removed, where the latter will be lightened after tempering and, without tedious control of the temperature conditions in the heat treatment, a fine pearlite texture can be secured over the whole cross-section in the switch diamond point which remains after the material removing treatment. Since such a type of switch diamond point which presents a fine pearlite texture over its total material cross-section is subsequently welded to connector rails, it is possible, also here with minimal effort to ensure the appropriate characteristics of strength also in the area of the weld, where finally after the welding an appropriate heat treatment of the weld zone is required to prevent occurrences of brittleness.

The method according to the invention will be applied to advantage when the weld spot is cooled and deburred with compressed air after the welding to the connector rails, after which in a particularly advantageous manner the switch diamond in the area of the weld seam is renealled whereby also in the area of the weld a fine pearlite texture is obtained.

The material removing treatment for the removal of undesirable textures can proceed in a particularly simple way by planing or milling, whereby it is advantageous to proceed so that the switch diamond point is rolled in a cross-cut dimension which exceeds the final dimension at least in the area of the wheel path surface and so that through the material removing treatment, 1 to 5 mm surface body would be stripped away. A removal of a cross-cut depth of 1 to 5 mm, particularly 2 to 3 mm, depending on the carbon content of the steel used for the production of the rolled switch diamond point ensures that also on the surface of the switch diamond point a fine pearlite texture is present, which offers the highest resistance to wear. By the known method, head hardened rails can be attached as connector rails or guard rails as the case may be.

The fact that the switch diamond point, a comparatively small construction part, is submitted to a heat treatment, allows bringing the switch diamond points in an oven to austenite temperature, particularly temperatures between 810° and 900° C., over the total cross-cut. After the appropriate thermal retardation of the switch diamond points, which at the temperatures listed above are generally uncritical, the switch diamond points are put into a temperable quenching medium, particularly a warm oil bath or salt bath, and cooled in such a way that a cooling down process takes place at a cool-down speed of from 1° to 7° C./second in the range of 800° to 500° C. The temperature of the quenching medium is controlled in a simple way, so that consideration can be made in a particularly simple way for differing load weights. After the quenching of the switch diamond point, a new stress-relieving annealing can be carried out at 300° to 550° C., whereby this type of stress-relieving annealing at 300° to 550° C. is advantageous, in those areas in which material will not be removed, for resulting in tempered martensite. Thus in this way, with relatively little effort a homogenous, fine pearlite texture is obtained in the switch diamond point, whereby, considering the minimal dimensions of the switch diamond points, a quantity of switch diamond points can be submitted to heat treatment at the same time, which results in an economizing and therefore further simplification. Through the possibility of subjecting a quantity of switch diamond points simultaneously to heat treatment, a basically identical texture of a quantity of such switch diamond points will be ensured, whereas by the known methods the thermal cycle underwent fluctuations as a rule in the subsequent heat treatment in the production procedure, and could as a consequence have irregular texture formations.

For the guard- and connector rails, industrial scale head hardened rails can be used.

As switch diamond point material for the production of a rolled switch diamond point, a steel having the guide analysis

| C | Si | Mn | maximum P | maximum S |
|---|---|---|---|---|
| 0.7–0.85 by weight percent | 0.3–0.5 | 0.8–1.5 | 0.04 | 0.04 | and the rest iron, has been shown to be particularly advantageous. With such a type of material for the switch diamond point, the following material specifications can be attained with a high rate of constancy:

| surface hardness | greater/same | 380–450 HV [diamond-penetrator hardness] |
|---|---|---|
| yield strength Re | greater/same | 800 N/nm$^2$ |
| resistance to extension Rm | greater/same | 1200 N/nm$^2$ |
| elasticity A | greater/same | 10% |
| notched impact work | greater/same | 30 J DVMF |

For the desired texture formation a relatively low austenite temperature, as listed above, can be chosen, whereby a finer core is obtained in the secondary texture, which combines higher toughness with higher yield strength and resistance to extension with higher resistance to wear. The texture structures, non-foliated and determined by the analysis range, which arise based on the different cross-cut forms of the switch diamond points, such as martensite and lower intermediary layers in the surface area, are eliminated with certainty through the machining process which follows the heat treatment, as is any de-carbonization which has appeared, so that the desired surfaces can be obtained with a greater certainty than the present state of the art.

I claim:

1. A method for the production of a switch diamond for rail switches and double crossovers with a switch diamond point out of carbon steel and connector rails, comprising the steps of:

rolling a switch diamond point in a cross-cut that exceeds its final dimension, at least in an area that wheels roll over;

submitting the switch diamond point to a heat treatment by which the switch diamond point is transformed over its total cross-section into a homogenous fine pearlite structure;

subsequently tempering the switch diamond point and at least in the area of the switch point that wheels roll over, removing 1 to 5 mm of wheel zone texture different from the homogenous fine pearlite texture; and afterwards welding the switch diamond point to the connector rails at a welding spot.

2. A method according to claim 1, further comprising the step of cooling with compressed air and deburring the welding spot after welding of the connector rails.

3. A method according to claim 1 or 2, further comprising the step of quenching the switch diamond point in the area of the welding spot.

4. A method according to claim 1 or 2 wherein the removing step is carried out by planing or milling.

5. A method according to claim 1 or 2, wherein as connector rails and guard rails, head-hardened rails are used.

6. A method according to claim 3 wherein the removing step is carried out by planing or milling.

7. A method according to claim 3 wherein as connector rails and guard rails, head-hardened rails are used.

8. A method according to claim 4 wherein as connector rails and guard rails, head-hardened rails are used.

* * * * *